(12) United States Patent
Heo

(10) Patent No.: US 12,147,226 B2
(45) Date of Patent: Nov. 19, 2024

(54) ONE-PEDAL CONTROL METHOD AND SYSTEM FOR AUTONOMOUS VEHICLE

(71) Applicants: Hyundai Motor Company, Seoul (KR); Kia Corporation, Seoul (KR)

(72) Inventor: Jae Sung Heo, Uiwang-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 335 days.

(21) Appl. No.: 17/896,670

(22) Filed: Aug. 26, 2022

(65) Prior Publication Data

US 2023/0305554 A1   Sep. 28, 2023

(30) Foreign Application Priority Data

Mar. 23, 2022   (KR) .................. 10-2022-0035933

(51) Int. Cl.
*B60T 7/06* (2006.01)
*B60W 30/18* (2012.01)
*B60W 50/02* (2012.01)
*G05D 1/00* (2006.01)

(52) U.S. Cl.
CPC ..... *G05D 1/0016* (2013.01); *B60W 30/18127* (2013.01); *B60W 50/0205* (2013.01); *G05D 1/0061* (2013.01); *G05D 1/0077* (2013.01); *G05D 1/0223* (2013.01); *B60W 2050/0215* (2013.01); *B60W 2050/022* (2013.01)

(58) Field of Classification Search
None
See application file for complete search history.

(56) References Cited

U.S. PATENT DOCUMENTS 10,946,741 B1 * 3/2021 Kim .................... B60T 7/06
2021/0362718 A1 * 11/2021 Ikenori ................ B60T 7/22

FOREIGN PATENT DOCUMENTS

| EP | 4265488 A1 * | 10/2023 | ............. B60L 7/10 |
| JP | 2019041538 A * | 3/2019 | |
| JP | 2019064468 A * | 4/2019 | |
| KR | 10-2017-0137427 | 12/2017 | |

* cited by examiner

*Primary Examiner* — Justin S Lee
(74) *Attorney, Agent, or Firm* — Morgan, Lewis & Bockius LLP

(57) ABSTRACT

A one-pedal control method and system for an autonomous vehicle, are configured for accelerating or decelerating a vehicle by use of a foldable accelerator pedal system when a foldable brake pedal system is broken down when a driver manually drives the autonomous vehicle or the mode is switched from an autonomous driving mode to a manual driving mode, and configured for implementing a fail-safe function by use of an integrated safety function of software.

20 Claims, 3 Drawing Sheets

ONE-PEDAL CONTROL METHOD AND SYSTEM FOR AUTONOMOUS VEHICLE

CROSS REFERENCE TO RELATED APPLICATION

The present application claims priority to Korean Patent Application No. 10-2022-0035933, filed Mar. 23, 2022, the entire contents of which is incorporated herein for all purposes by this reference.

BACKGROUND OF THE PRESENT DISCLOSURE

Field of the Present Disclosure

The present disclosure relates to a one-pedal control method and system for an autonomous vehicle, and more particularly, to a technology related to a one-pedal control method and system for an autonomous vehicle, which are capable of accelerating or decelerating a vehicle by use of a foldable accelerator pedal system when a foldable brake pedal system is broken down.

Description of Related Art

An autonomous vehicle refers to a smart vehicle to which an autonomous driving technology is applied so that the autonomous vehicle autonomously arrives at a destination even though a driver does not directly manipulate a steering wheel, an accelerator pedal, and a brake pedal. Recently, the autonomous vehicle is actively developed.

In a case in which an autonomous driving situation is universally implemented, the driver may select a manual driving mode in which the driver directly drives the autonomous vehicle and an autonomous driving mode in which the driver does not directly drive the autonomous vehicle and the autonomous vehicle autonomously travels to the destination.

It is necessary to enable the driver to take a rest comfortably with his feet stretched in the autonomous driving mode. If pedals (an accelerator pedal and a brake pedal) positioned in a lower space of a driver seat are kept exposed to the interior of the autonomous vehicle in the autonomous driving mode, the pedals disturb the driver's relaxation. If a pad of a pedal device is erroneously manipulated regardless of the driver's intention, there is a high concern that autonomous driving is forcibly stopped, which may cause an accident.

Therefore, a foldable pedal device for an autonomous vehicle is actively developed, in which the pad of the pedal device is exposed to protrude toward the driver so that the driver may manipulate the pad in the manual driving mode in which the driver directly drives the autonomous vehicle, and the pad of the pedal device is hidden so as not to protrude toward the driver in the autonomous driving mode so that the pad cannot be manipulated by the driver, ensuring the driver's comfortable relaxation and implementing safety by preventing an erroneous manipulation.

A state in which the foldable pedal device is exposed to protrude toward the driver to allow the driver's manual driving is referred to as a pop-up state, and a state in which the foldable pedal device is hidden so as not to protrude toward the driver in the autonomous driving situation is referred to as a hide state.

The foldable pedal device provided in the autonomous vehicle includes a foldable accelerator pedal system and a foldable brake pedal system. The foldable accelerator pedal system and the foldable brake pedal system are typically configured to simultaneously pop up or hide.

The foldable accelerator pedal system and the foldable brake pedal system each include a pedal or pad configured to be manipulated by the driver, an actuator or motor configured to provide power for performing a foldable function, a sensor, and a control logic for performing the foldable function.

Meanwhile, in a case in which any one of the foldable accelerator pedal system and the foldable brake pedal system is broken down, the driver needs to accelerate or brake the autonomous vehicle by manipulating the other pedal system which is not broken down. The above-mentioned system is referred to as a one-pedal system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a one-pedal control method and system for an autonomous vehicle, which are capable of accelerating or decelerating a vehicle by use of a foldable accelerator pedal system when a foldable brake pedal system is broken down. The present disclosure also aims to implement a fail-safe function by utilizing an integrated safety function of software instead of doubly configuring hardware to ensure redundancy, reducing the number of components and costs, ensuring convenience of use, and improving marketability.

Various aspects of the present disclosure are directed to providing a one-pedal control method for an autonomous vehicle, the one-pedal control method including: a breakdown diagnosis step of performing diagnosis of breakdown on a foldable accelerator pedal system and a foldable brake pedal system when the autonomous vehicle is manually driven currently or a mode of the autonomous vehicle is switched from an autonomous driving mode to a manual driving mode; an autonomous driving determination step of determining whether autonomous driving of the autonomous vehicle is possible when it is determined that the foldable brake pedal system is broken down and the foldable accelerator pedal system is normal; a one-pedal activating step of activating a one-pedal system using the foldable accelerator pedal system when a result of the determination in the autonomous driving determination step indicates that the autonomous driving is impossible; and a one-pedal control step of manipulating, by the driver, a foldable accelerator pedal and controlling a traveling of the autonomous vehicle after the one-pedal system using the foldable accelerator pedal system is activated, in which the one-pedal control step is a one-pedal mode in which the autonomous vehicle accelerates when the foldable accelerator pedal is pressed and manipulated, and the autonomous vehicle decelerates or brakes when an operating force of the foldable accelerator pedal is eliminated.

The breakdown of the foldable accelerator pedal system and the foldable brake pedal system may include one or more of mechanical defects of hardware including a pedal and a motor, errors of functions of a sensor, and errors of software for controlling a foldable function of the foldable accelerator pedal system and the foldable brake pedal system.

When a result of the determination in the breakdown diagnosis step indicates that the foldable accelerator pedal system and the foldable brake pedal system are normal, the autonomous vehicle may be normally kept in the manual driving mode or the mode may be normally switched to the manual driving mode, and control logic may be ended.

When the result of the determination in the autonomous driving determination step indicates that the autonomous driving is possible, the mode of the autonomous vehicle may be switched to the autonomous driving mode or the autonomous driving mode may be maintained.

When the result of the determination in the autonomous driving determination step indicates that the autonomous driving is possible, the autonomous vehicle may move in an autonomous driving state to a safety zone, and then control logic may be ended.

When the result of the determination in the autonomous driving determination step indicates that the autonomous driving is impossible, the autonomous vehicle may travel in the one-pedal mode using the foldable accelerator pedal system and move to a safety zone, and then control logic may be ended.

The one-pedal control method may further include: a check step of checking whether a smart cruise control system of the autonomous vehicle is usable before the one-pedal control step is performed after the one-pedal activating step; a determination step of determining a traveling safety speed when a result of the checking indicates that the smart cruise control system is usable; and a pedal stroke determination step of determining whether a stroke of the foldable accelerator pedal currently manipulated is equal to or greater than an input value of a pedal stroke corresponding to the travelling safety speed after the traveling safety speed is determined, in which the one-pedal control step is activated when a condition of the pedal stroke determination step is satisfied.

The traveling safety speed in the determination step may be a speed limit automatically determined by an autonomous driving controller of the autonomous vehicle in consideration of one or more of a road condition, a speed of a peripheral vehicle, and a weather situation.

The autonomous vehicle constantly may travel at the determined travelling safety speed on the same lane between the determination step and the pedal stroke determination step before the foldable accelerator pedal is operated in response to a driver's manipulation thereof.

When a condition of the pedal stroke determination step is not satisfied, the autonomous vehicle may keep traveling constantly and continuously at the determined travelling safety speed on the same lane.

The one-pedal control step may be performed when a result of the determination in the check step indicates that the smart cruise control system is not usable.

Regenerative braking of the autonomous vehicle may be set to a maximum level when the one-pedal control step is activated.

Furthermore, various aspects, various aspects of the present disclosure are directed to providing a one-pedal control system for an autonomous vehicle, which is configured to perform the control method, the one-pedal control system including: a foldable pedal controller configured to receive a request to check whether the foldable accelerator pedal system and the foldable brake pedal system are abnormal from an autonomous driving controller when the autonomous vehicle is manually driven currently or when the mode is switched from the autonomous driving mode to the manual driving mode, the foldable pedal controller being configured to transmit a result of breakdown diagnosis for the foldable accelerator pedal system and the foldable brake pedal system to the autonomous driving controller, in which when a result of the breakdown diagnosis indicates that the foldable brake pedal system is broken down and the foldable accelerator pedal system is normal, the autonomous driving controller is configured to determine whether autonomous driving of the autonomous vehicle is possible, in which when the determination result related to the autonomous driving indicates that the autonomous driving is impossible, the one-pedal system using the foldable accelerator pedal system is activated, and in which when the determination result related to the autonomous driving indicates that the autonomous driving is possible, the mode of the autonomous vehicle is switched to the autonomous driving mode or the autonomous driving mode is maintained.

The one-pedal control system may further include: a driving mode switch configured for selecting the autonomous driving mode or the manual driving mode of the autonomous vehicle in response to a manipulation thereof; a drive motor controller and a braking controller configured to generate and transmit control signals to a drive motor and a braking system of the autonomous vehicle, respectively; and a vehicle controller configured to receive a control signal from the autonomous driving controller and generate and transmit control signals to the drive motor controller and the braking controller.

The breakdown of the foldable accelerator pedal system and the foldable brake pedal system may include one or more of mechanical defects of hardware including a pedal and a motor, errors of functions of a sensor, and errors of software for controlling a foldable function of the foldable accelerator pedal system and the foldable brake pedal system.

The one-pedal system using the foldable accelerator pedal system may be a one-pedal mode in which the autonomous vehicle is configured to accelerate when the foldable accelerator pedal is pressed and manipulated, and the autonomous vehicle is configured to decelerate or brake when operating force of the foldable accelerator pedal is eliminated.

Regenerative braking of the autonomous vehicle may be set to a maximum level in the one-pedal mode.

When the autonomous driving controller determines that the autonomous driving is possible, the autonomous vehicle may move in an autonomous driving state to a safety zone, and then control logic may be ended.

When the autonomous driving controller determines that the autonomous driving is impossible, the autonomous vehicle may move to a safety zone in the one-pedal mode, and then control logic may be ended.

Furthermore, various aspects, various aspects of the present disclosure are directed to providing a one-pedal control system for an autonomous vehicle, the one-pedal control system including: a foldable pedal controller configured to perform control so that a foldable accelerator pedal system and a foldable brake pedal system are in a pop-up state when a mode of the autonomous vehicle is switched from an autonomous driving mode to a manual driving mode, and the foldable accelerator pedal system and the foldable brake pedal system are in a hide state when the mode is switched from the manual driving mode to the autonomous driving mode, in which the foldable pedal controller is configured to receive a request to check whether the foldable accelerator pedal system and the foldable brake pedal system are abnormal from an autonomous driving controller when the autonomous vehicle is manually driven currently or when the mode is switched from the autonomous driving mode to the manual driving mode, and the foldable pedal controller is configured to transmit a result of breakdown diagnosis for the foldable accelerator pedal system and the foldable brake pedal system to the autonomous driving controller, in which when the result of the breakdown diagnosis indicates that one of the foldable accelerator pedal system and the foldable brake pedal system is broken down and another of the foldable accelerator pedal system and the foldable brake pedal system is normal, a one-pedal system is activated, in which traveling of the autonomous vehicle is controlled by manipulating the pedal system that operates normally, and in which the breakdown of the foldable accelerator pedal system and the foldable brake pedal system includes one or more of mechanical defects of hardware including a pedal and a motor, errors of functions of a sensor, and errors of software for controlling a foldable function of the foldable accelerator pedal system and the foldable brake pedal system.

According to the one-pedal control method and system for an autonomous vehicle according to an exemplary embodiment of the present disclosure, in the case in which the foldable brake pedal system is broken down when the driver manually drives the autonomous vehicle or when the mode is switched from the autonomous driving mode to the manual driving mode, the driver may accelerate or decelerate the autonomous vehicle by use of the foldable accelerator pedal system. Therefore, it is possible to implement the fail-safe function by utilizing the integrated safety function of software instead of doubly configuring hardware to ensure redundancy, reducing the number of components and costs, ensuring convenience of use, and improving marketability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
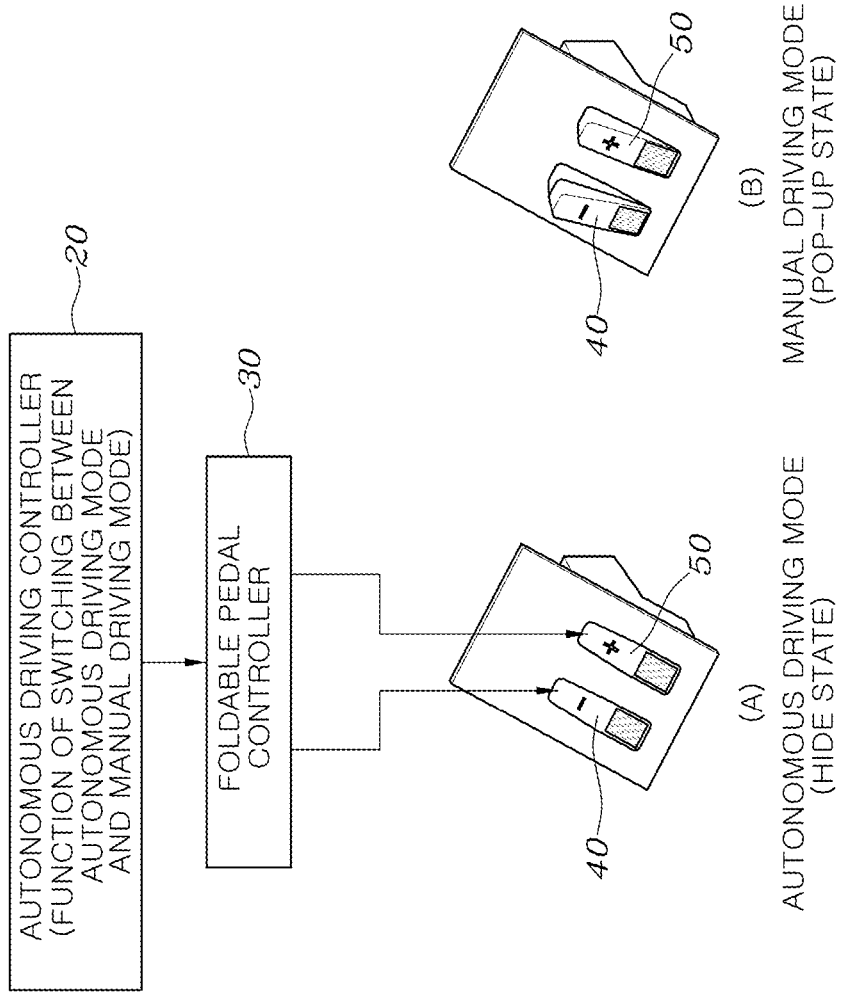
FIG. 1, FIG. 2, and FIG. 3 are a schematic configuration view, a block diagram, and a flowchart for explaining a one-pedal control method and system for an autonomous vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of embodiments of the present disclosure disclosed in the present specification or application are exemplified only for the purpose of explaining exemplary embodiment of the present disclosure, the exemplary embodiments of the present disclosure may be carried out in various forms, and it should not be interpreted that the present disclosure is limited to the exemplary embodiments described in the present specification or application.

Because the exemplary embodiments of the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or directly connected to another constituent element, and an intervening constituent element can also be present between the constituent elements. When one constituent element is described as being "directly coupled to" or "directly connected to" another constituent element, it should be understood that no intervening constituent element is present between the constituent elements. Other expressions, that is, "between" and "just between" or "adjacent to" and "directly adjacent to", for explaining a relationship between constituent elements, may be interpreted in a similar manner.

The terms used in the present specification are used only for describing various exemplary embodiments and are not intended to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which an exemplary embodiment of the present disclosure pertains. The terms such as those defined in commonly used dictionaries should be interpreted as having meanings consistent with meanings in the context of related technologies and should not be interpreted as ideal or excessively formal meanings unless explicitly defined in the present specification.

A control unit (controller) according to various exemplary embodiments of the present disclosure may be implemented by a non-volatile memory configured to algorithm for controlling operations of various constituent elements in a vehicle or store data related to software commands for executing the algorithm, and by a processor configured to perform the following operations by use of the data stored in the corresponding memory. In the instant case, the memory and the processor may be implemented as separate chips. Alternatively, the memory and the processor may be implemented as a single chip in which the memory and the processor are integrated. The processor may be configured in a form of one or more processors.

Hereinafter, a one-pedal control method and system for an autonomous vehicle according to various exemplary embodiments of the present disclosure will be described with reference to FIG. 1, FIG. 2, and FIG. 3.

An autonomous vehicle may be configured for selecting a manual driving mode in which the driver directly drives the autonomous vehicle and an autonomous driving mode in which the driver does not directly drive the autonomous vehicle and the autonomous vehicle autonomously travels to the destination.

Figure 2:
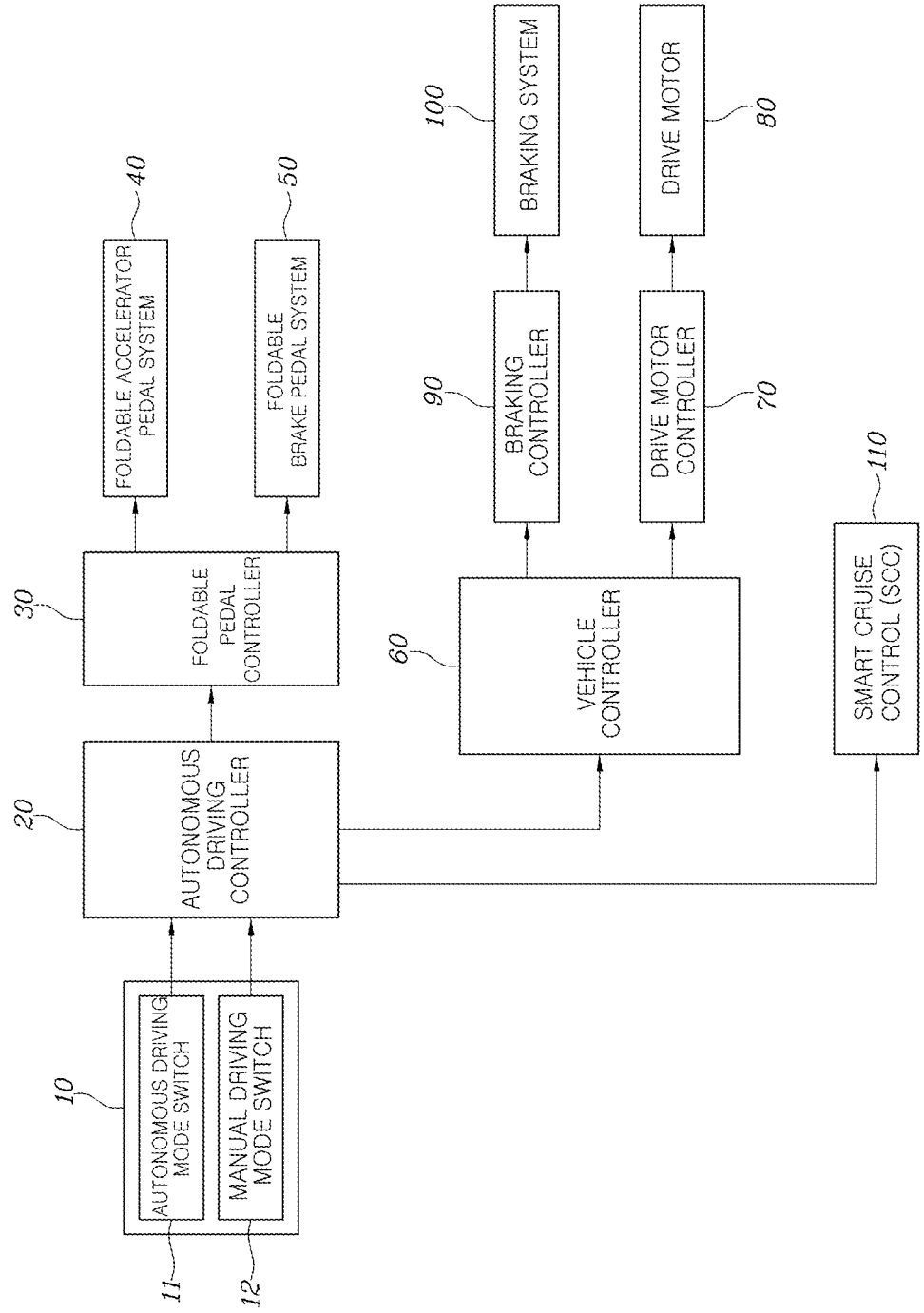

As illustrated in FIGS. 1 to 2, the driver may select the autonomous driving mode or the manual driving mode of the autonomous vehicle by manipulating a driving mode switch 10.

The driving mode switch 10 may include an autonomous driving mode switch 11 and a manual driving mode switch 12 which are independently provided and configured so that the driver may manipulate the autonomous driving mode switch 11 and the manual driving mode switch 12.

As an exemplary embodiment of the present disclosure, the driving mode switch 10 may be configured as a single switch configured so that the autonomous driving mode is performed when the driver manipulates the driving mode switch 10 once, and the manual driving mode is performed when the driver manipulates the driving mode switch 10 once again.

The driving mode switch 10 may be provided at the periphery of a driver seat to allow the driver to easily manipulate the driving mode switch 10. In the autonomous vehicle, the driving mode switch 10 may be positioned on a seat of the driver seat, as necessary.

When the driver manipulates the autonomous driving mode switch 11 or the manual driving mode switch 12, an operating signal is transmitted to an autonomous driving controller 20. The autonomous driving controller 20 transmits a control signal to a foldable pedal controller 30, and a foldable accelerator pedal system 40 and a foldable brake pedal system 50 operates to pop up or hide under the control of the foldable pedal controller 30.

When an autonomous driving mode signal is generated as the driver manipulates the autonomous driving mode switch 11, both the foldable accelerator pedal system 40 and the foldable brake pedal system 50 are controlled in operation by the autonomous driving controller 20 so that the foldable accelerator pedal system 40 and the foldable brake pedal system 50 are in a hide state (state an in FIG. 1).

Furthermore, when a manual driving mode signal is generated as the driver manipulates the manual driving mode switch 12, both the foldable accelerator pedal system 40 and the foldable brake pedal system 50 are controlled in operation by the autonomous driving controller 20 so that the foldable accelerator pedal system 40 and the foldable brake pedal system 50 are in a pop-up state (state B in FIG. 1).

The foldable accelerator pedal system 40 and the foldable brake pedal system 50 are provided and positioned in a lower space of the driver seat so that the driver manipulates the foldable accelerator pedal system 40 and the foldable brake pedal system 50 with his or her foot.

To ensure the driver's comfortable relaxation and implement safety by preventing an erroneous manipulation in the autonomous driving mode, the foldable accelerator pedal system 40 and the foldable brake pedal system 50 need to be in the hide state in which the foldable accelerator pedal system 40 and the foldable brake pedal system 50 are not exposed to the driver. Therefore, the pedal device needs to be hidden so as not to protrude toward the driver.

Furthermore, in the manual driving mode in which the driver drives the autonomous vehicle, the driver manipulates the foldable accelerator pedal system 40 and the foldable brake pedal system 50 with his or her foot. To the present end, the foldable accelerator pedal system 40 and the foldable brake pedal system 50 need to pop up to be exposed toward the driver.

When the driver manipulates the foldable accelerator pedal system 40 in the manual driving mode situation in which both the foldable accelerator pedal system 40 and the foldable brake pedal system 50 pop up, the autonomous driving controller 20 transmits a control signal to a vehicle controller 60. The autonomous vehicle controller 60 transmits a control signal to a drive motor controller 70 and operates a drive motor 80 provided in the autonomous vehicle so that the autonomous vehicle accelerates.

Furthermore, when the driver manipulates the foldable brake pedal system 50 in the manual driving mode situation in which both the foldable accelerator pedal system 40 and the foldable brake pedal system 50 pop up, the autonomous driving controller 20 transmits a control signal to the autonomous vehicle controller 60. The autonomous vehicle controller 60 transmits a control signal to a braking controller 90 and operates a braking system 100 provided in the autonomous vehicle so that the autonomous vehicle brakes.

A one-pedal control system for an autonomous vehicle according to an exemplary embodiment of the present disclosure includes the foldable pedal controller 30 receiving a request to check whether the system is abnormal from the autonomous driving controller 20 when the driver manually drives the autonomous vehicle currently or when the mode is switched from the autonomous driving mode to the manual driving mode. The foldable pedal controller 30 transmits a result of breakdown diagnosis for the foldable accelerator pedal system 40 and the foldable brake pedal system 50 to the autonomous driving controller 20. When the result of the breakdown diagnosis indicates that the foldable brake pedal system 50 is broken down and the foldable accelerator pedal system 40 is normal, the autonomous driving controller 20 determines whether the autonomous driving of the autonomous vehicle is possible. When the determination result related to the autonomous driving indicates that the autonomous driving is impossible, the one-pedal system is activated by use of the foldable accelerator pedal system 40. When the determination result related to the autonomous driving indicates that the autonomous driving is possible, the mode of the autonomous vehicle is switched to the autonomous driving mode or the autonomous driving mode is maintained.

Furthermore, the one-pedal control system for an autonomous vehicle according to an exemplary embodiment of the present disclosure includes the foldable pedal controller 30 configured to perform control so that the foldable accelerator pedal system 40 and the foldable brake pedal system 50 are in the pop-up state when the mode is switched from the autonomous driving mode to the manual driving mode, and the foldable accelerator pedal system 40 and the foldable brake pedal system 50 are in the hide state when the mode is switched from the manual driving mode to the autonomous driving mode. The foldable pedal controller 30 receives a request to check whether the system is abnormal from the autonomous driving controller 20 when the driver manually drives the autonomous vehicle currently or when the mode is switched from the autonomous driving mode to the manual driving mode. The foldable pedal controller 30 transmits a result of breakdown diagnosis for the foldable accelerator pedal system 40 and the foldable brake pedal system 50 to the autonomous driving controller 20. When the result of the breakdown diagnosis indicates that any one of the foldable accelerator pedal system 40 and the foldable brake pedal system 50 is broken down and the other of the foldable accelerator pedal system 40 and the foldable brake pedal system 50 is normal, the one-pedal system is activated in which the traveling of the autonomous vehicle is controlled by manipulating the pedal system that operates normally. The breakdown of the foldable accelerator pedal system 40 and the foldable brake pedal system 50 includes one or more of mechanical defects of hardware including the pedal and motor, errors of functions of the sensor, and errors of software for controlling the foldable function.

In an exemplary embodiment of the present invention, the autonomous driving controller 20, the foldable pedal controller 30, the autonomous vehicle controller 60, the drive motor controller 70 and the braking controller 90 may be implemented as one controller.

Figure 3:
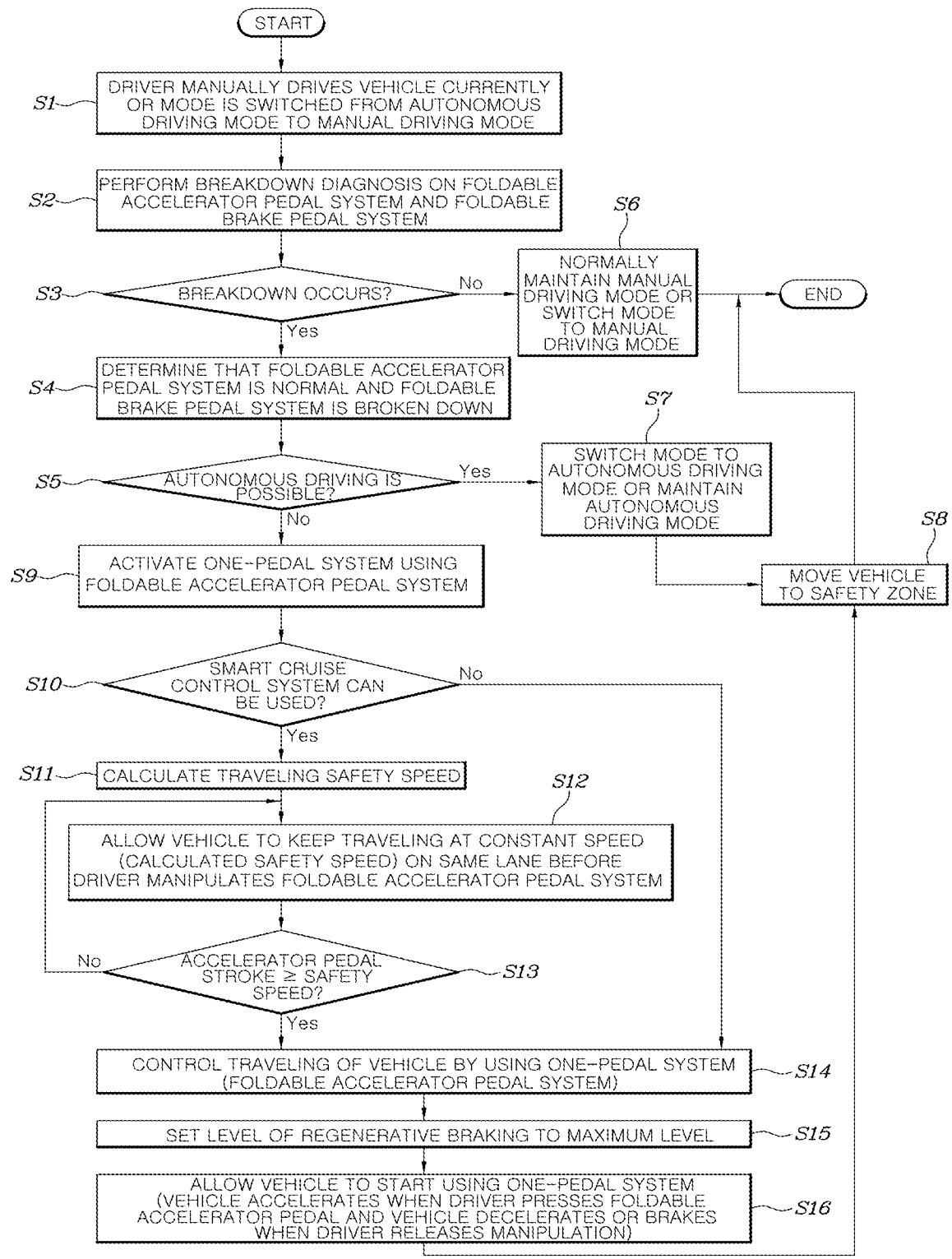

FIG. 3 is a flowchart for explaining a one-pedal control method for an autonomous vehicle according to an exemplary embodiment of the present disclosure.

As illustrated, when the driver manually drives the autonomous vehicle currently or when the mode is switched from the autonomous driving mode to the manual driving mode (step S1), the foldable pedal controller 30 performs a breakdown diagnosis step (step S2) of performing diagnosis of breakdown on the foldable accelerator pedal system 40 and the foldable brake pedal system 50 in response to the request from the autonomous driving controller 20 and transmits the result of the breakdown diagnosis to the autonomous driving controller 20.

In step S3, when the result of the breakdown diagnosis indicates that the foldable accelerator pedal system 40 is normal and the foldable brake pedal system 50 is broken down (step S4), an autonomous driving determination step (step S5) of determining whether the autonomous driving of the autonomous vehicle is possible is performed.

The autonomous driving determination step (step S5) is performed by the autonomous driving controller 20 of the autonomous vehicle.

The breakdown of the foldable accelerator pedal system 40 and the foldable brake pedal system 50 may include one or more of mechanical defects of hardware including the pedal or pad configured to be manipulated by the driver's foot and the actuator or motor configured to provide power for performing the foldable function, errors of functions of the sensor, and errors of software for controlling the foldable function.

The mechanical defects of hardware may include trapping or adhesion of operation mechanisms, defects of the pop-up and hiding operations, and the like. The errors of sensor functions may include stroke sensing defects of the pedal.

When the result of the determination in step S3 indicates that the foldable accelerator pedal system 40 and the foldable brake pedal system 50 are normal, the autonomous vehicle is normally kept in the manual driving mode or the mode is normally switched to the manual driving mode (step S6), and the control logic of the present disclosure is ended.

When the result of the determination in the autonomous driving determination step (step S5) indicates that the autonomous driving is possible, the mode of the autonomous vehicle is switched to the autonomous driving mode or the autonomous driving mode is maintained (step S7), and the autonomous vehicle moves to the nearest garage, a shoulder of the road, or a safety zone in a region in which the autonomous vehicle may autonomously travel in the autonomous driving state (step S8). After the autonomous vehicle moves, a gear shifting position of the autonomous vehicle changes to a park position (P-position), the autonomous vehicle is turned off, and the control logic of the present disclosure is ended.

Meanwhile, when the result of the determination in the autonomous driving determination step (step S5) indicates that the autonomous driving is impossible, a one-pedal activating step (step S9) of activating the one-pedal system using the foldable accelerator pedal system 40 according to an exemplary embodiment of the present disclosure is performed.

After the one-pedal activating step (step S9) is performed, a check step of checking whether a smart cruise control (SCC) system 110 of the autonomous vehicle may be used (step S10).

When the result of the determination in the check step (step S10) indicates that the smart cruise control system 110 may be used, the autonomous driving controller 20 performs a determination step (step S11) of automatically determining a traveling safety speed corresponding to a speed limit in consideration of one or more of a road condition (a general road, an expressway, and the like), speeds of peripheral vehicles, and weather situations (snow, rain, fog, and the like).

For example, the determined traveling safety speed may be set to 80 km/h when the autonomous vehicle travels on the general road with no traffic jam in a fine day, 80 km/h which is a speed reduced by 20% from the speed limit of 100 km/h when the autonomous vehicle travels on the expressway with no traffic jam in a rainy or snowy day, and 40 km/h when the peripheral vehicles travel at 40 km/h because of traffic jam.

After the traveling safety speed is set in the determination step (step S11), a step (step S12) of driving the autonomous vehicle constantly at the determined travelling safety speed on the same lane before the foldable accelerator pedal is operated in response to a driver's manipulation thereof.

There is a problem in that traveling safety deteriorates if the traveling vehicle changes the lane or the autonomous vehicle speed is rapidly changed before the driver manipulates the foldable accelerator pedal system 40 during the process of activating the one-pedal system using the foldable accelerator pedal system 40. To prevent the problem, after the determination step (step S11) is completed, the autonomous vehicle may constantly travel at the determined travelling safety speed on a same lane before the foldable accelerator pedal is operated in response to a driver's manipulation thereof.

After step S12, visual and auditory information related to the activation of the one-pedal system using the foldable accelerator pedal system 40 is provided to the driver. A pedal stroke determination step (step S13) of determining whether a stroke of the foldable accelerator pedal currently manipulated by the driver is equal to or greater than an input value of a pedal stroke corresponding to the travelling safety speed is performed when the driver manipulates the foldable accelerator pedal system 40.

When the condition of the pedal stroke determination step (step S13) is satisfied, i.e., when the stroke of the foldable accelerator pedal currently manipulated by the driver is equal to or greater than the input value of the pedal stroke corresponding to the safety vehicle speed, a one-pedal control step (step S14) corresponding to a one-pedal acceleration system using the foldable accelerator pedal system 40 is performed.

The one-pedal control step (step S14) means a one-pedal mode in which the driver controls the traveling of the autonomous vehicle by manipulating only the foldable accelerator pedal system 40.

However, when the condition of the pedal stroke determination step (step S13) is not satisfied, i.e., when the stroke of the foldable accelerator pedal currently manipulated by the driver is less than the input value of the pedal stroke corresponding to the current vehicle speed, the control logic of the present disclosure goes back to step S12 of allowing the autonomous vehicle to keep traveling continuously and constantly at the determined travelling safety speed on the same lane.

The pedal stroke determination step (step S13) is a step for allowing the driver to press the foldable accelerator pedal as much as necessary to meet the safety speed, ensuring traveling safety.

If the one-pedal acceleration system is immediately activated when the driver does not press the foldable accelerator pedal system 40 during a process of activating the one-pedal acceleration system, the autonomous vehicle may be rapidly braked by regenerative braking, which may cause a dangerous situation.

Therefore, the one-pedal acceleration system may start when the stroke of the foldable accelerator pedal is performed to a degree corresponding to the travelling safety speed in the state in which the traveling speed of the host vehicle is adjusted to the traveling safety speed similar to the autonomous vehicle speeds of the peripheral vehicles. Therefore, it is possible to eliminate heterogeneity and ensure traveling safety.

When the activation of the one-pedal control step (step S14) is completed, the regenerative braking of the autonomous vehicle is set to a maximum level under the control of the autonomous driving controller 20 to ensure traveling safety (step S15), and visual and auditory information on the setting of the maximum level of the regenerative braking may be provided to the driver.

The maximum level of the regenerative braking means a level at which the autonomous vehicle stops when the driver eliminates the operating force from the accelerator pedal.

When the regenerative braking is set to the maximum level in step S15, the autonomous vehicle travels by use of the one-pedal acceleration system (one-pedal control) using the foldable accelerator pedal system 40. The one-pedal acceleration system (one-pedal control) is a one-pedal mode in which the autonomous vehicle accelerates when the driver presses and manipulates the foldable accelerator pedal, and the autonomous vehicle is decelerated or braked by the regenerative braking when the driver eliminates the operating force (step S16).

Furthermore, the autonomous vehicle having traveled by use of the one-pedal acceleration system (one-pedal control) moves to the nearest garage, the shoulder of the road, or the safety zone (step S8). After the autonomous vehicle moves, the gear shifting position of the autonomous vehicle changes to the park position (P-position), the autonomous vehicle is turned off, and the control logic of the present disclosure is ended.

Meanwhile, when the result of the determination in the check step (step S10) indicates that the smart cruise control system 110 cannot be used, the control logic of the present disclosure immediately performs the one-pedal control step (step S14) without performing steps S11, S12, and S13.

According to the exemplary embodiment of the present disclosure described above, in the case in which the foldable brake pedal system 50 is broken down when the driver manually drives the autonomous vehicle or when the mode is switched from the autonomous driving mode to the manual driving mode, the driver may accelerate or decelerate the autonomous vehicle by use of the foldable accelerator pedal system 40. Therefore, it is possible to implement the fail-safe function by utilizing the integrated safety function of software instead of doubly configuring hardware to ensure redundancy, reducing the number of components and costs, ensuring convenience of use, and improving marketability.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A one-pedal control method for an autonomous vehicle, the one-pedal control method comprising:
    performing diagnosis of breakdown on a foldable accelerator pedal system and a foldable brake pedal system when the autonomous vehicle is manually driven currently or a mode of the autonomous vehicle is switched from an autonomous driving mode to a manual driving mode;
    determining whether autonomous driving of the autonomous vehicle is possible when it is determined that the foldable brake pedal system is broken down and the foldable accelerator pedal system is normal;
    activating a one-pedal system using the foldable accelerator pedal system to control the foldable accelerator pedal of the foldable accelerator pedal system to be in a pressable state while a foldable brake pedal of the foldable brake system is in a unpressable state; and
    manipulating the foldable accelerator pedal of the foldable accelerator pedal system and controlling a traveling of the autonomous vehicle after the one-pedal system using the foldable accelerator pedal system is activated,
    wherein in the activating of the one-pedal system using the foldable accelerator pedal system, the autonomous vehicle is configured to accelerate when the foldable accelerator pedal is pressed and manipulated, and the autonomous vehicle is configured to decelerate or to brake when an operating force of the foldable accelerator pedal is eliminated.

2. The one-pedal control method of claim 1, wherein the breakdown of the foldable accelerator pedal system and the foldable brake pedal system includes one or more of mechanical defects of hardware including a pedal and a motor, errors of functions of a sensor, and errors of software for controlling a foldable function of the foldable accelerator pedal system and the foldable brake pedal system.

3. The one-pedal control method of claim 1, wherein when a result of the performing of the diagnosis of the breakdown on the foldable accelerator pedal system and the foldable brake pedal system indicates that the foldable accelerator pedal system and the foldable brake pedal system are normal, the autonomous vehicle is kept in the manual driving mode or the mode is switched to the manual driving mode.

4. The one-pedal control method of claim 1, wherein when a result of the determining whether the autonomous driving of the autonomous vehicle is possible indicates that the autonomous driving is possible, the mode of the autonomous vehicle is switched to the autonomous driving mode or the autonomous driving mode is maintained.

5. The one-pedal control method of claim 1, wherein when a result of the determining whether the autonomous driving of the autonomous vehicle is possible indicates that the autonomous driving is possible, the autonomous vehicle is configured to move in an autonomous driving state to a predetermined zone.

6. The one-pedal control method of claim 1, wherein when a result of the determining whether the autonomous driving of the autonomous vehicle is possible indicates that the autonomous driving is impossible, the autonomous vehicle is configured to travel in a one-pedal mode using the foldable accelerator pedal system and to move to a predetermined zone.

7. The one-pedal control method of claim 1, further including:
    checking whether a smart cruise control system of the autonomous vehicle is usable before the manipulating of the foldable accelerator pedal and the controlling of the traveling of the autonomous vehicle are performed after the activating of the one-pedal system using the foldable accelerator pedal system;
    determining a traveling safety speed when a result of the checking indicates that the smart cruise control system is usable; and
    determining whether a stroke of the foldable accelerator pedal currently manipulated is equal to or greater than an input value of a pedal stroke corresponding to the travelling safety speed after the traveling safety speed is determined,
    wherein the manipulating of the foldable accelerator pedal and controlling of the traveling of the autonomous vehicle are activated when a condition of the determining of whether the stroke of the foldable accelerator pedal currently manipulated is equal to or greater than the input value of the pedal stroke is satisfied.

8. The one-pedal control method of claim 7, wherein the traveling safety speed in the determining of the traveling safety speed is a speed limit automatically determined by an autonomous driving controller of the autonomous vehicle in consideration of one or more of a road condition, a speed of a peripheral vehicle, and a weather situation.

9. The one-pedal control method of claim 7, wherein the autonomous vehicle is configured to constantly travel at the determined travelling safety speed on a same lane between the determining of the traveling safety speed and the determining of whether the stroke of the foldable accelerator pedal currently manipulated is equal to or greater than the input value of the pedal stroke before the foldable accelerator pedal is operated in response to a driver's manipulation thereof.

10. The one-pedal control method of claim 7, wherein when a condition of the determining of whether the stroke of the foldable accelerator pedal currently manipulated is equal to or greater than the input value of the pedal stroke is not satisfied, the autonomous vehicle is configured to keep traveling constantly and continuously at the determined travelling safety speed on a same lane.

11. The one-pedal control method of claim 7, wherein the manipulating of the foldable accelerator pedal and the controlling of the traveling of the autonomous vehicle are performed when a result of the checking whether the smart cruise control system of the autonomous vehicle is usable indicates that the smart cruise control system is not usable.

12. The one-pedal control method of claim 1, wherein regenerative braking of the autonomous vehicle is set to a maximum level when the manipulating of the foldable accelerator pedal and the controlling of the traveling of the autonomous vehicle are activated.

13. A one-pedal control system for the autonomous vehicle, which is configured to perform the control method of claim 1, the one-pedal control system including:
a foldable pedal controller configured to receive a request to check whether the foldable accelerator pedal system and the foldable brake pedal system are abnormal from an autonomous driving controller when the autonomous vehicle is manually driven currently or when the mode is switched from the autonomous driving mode to the manual driving mode, the foldable pedal controller being configured to transmit a result of the performing of the diagnosis of the breakdown for the foldable accelerator pedal system and the foldable brake pedal system to the autonomous driving controller,
wherein when a result of the performing of the diagnosis of the breakdown indicates that the foldable brake pedal system is broken down and the foldable accelerator pedal system is normal, the autonomous driving controller is configured to determine whether the autonomous driving of the autonomous vehicle is possible,
wherein when a result of the determining whether the autonomous driving of the autonomous vehicle is possible indicates that the autonomous driving is impossible, the one-pedal system using the foldable accelerator pedal system is activated, and
wherein when the result of the determining whether the autonomous driving of the autonomous vehicle is possible indicates that the autonomous driving is possible, the mode of the autonomous vehicle is switched to the autonomous driving mode or the autonomous driving mode is maintained.

14. The one-pedal control system of claim 13, further including:
a driving mode switch configured for selecting the autonomous driving mode or the manual driving mode of the autonomous vehicle in response to a manipulation of the driving mode switch;
a drive motor controller and a braking controller configured to generate and transmit control signals to a drive motor and a braking system of the autonomous vehicle, respectively; and
a vehicle controller configured to receive a control signal from the autonomous driving controller and to generate and transmit control signals to the drive motor controller and the braking controller.

15. The one-pedal control system of claim 14, wherein the breakdown of the foldable accelerator pedal system and the foldable brake pedal system includes one or more of mechanical defects of hardware including a pedal and a motor, errors of functions of a sensor, and errors of software for controlling a foldable function of the foldable accelerator pedal system and the foldable brake pedal system.

16. The one-pedal control system of claim 14, wherein the one-pedal system using the foldable accelerator pedal system includes a one-pedal mode in which the autonomous vehicle is configured to accelerate when the foldable accelerator pedal is pressed and manipulated, and the autonomous vehicle is configured to decelerate or brake when operating force of the foldable accelerator pedal is eliminated.

17. The one-pedal control system of claim 16, wherein regenerative braking of the autonomous vehicle is set to a maximum level in the one-pedal mode.

18. The one-pedal control system of claim 14, wherein when the autonomous driving controller concludes that the autonomous driving is possible, the autonomous vehicle is configured to move in an autonomous driving state to a predetermined zone.

19. The one-pedal control system of claim 14, wherein when the autonomous driving controller concludes that the autonomous driving is impossible, the autonomous vehicle is configured to move to a predetermined zone in a one-pedal mode.

20. A one-pedal control system for an autonomous vehicle, the one-pedal control system comprising:
a foldable pedal controller configured to perform control so that a foldable accelerator pedal system and a foldable brake pedal system are in a pressable state when a mode of the autonomous vehicle is switched from an autonomous driving mode to a manual driving mode, and the foldable accelerator pedal system and the foldable brake pedal system are in a unpressable state when the mode is switched from the manual driving mode to the autonomous driving mode,
wherein the foldable pedal controller is configured to receive a request to check whether the foldable accelerator pedal system and the foldable brake pedal system are abnormal from an autonomous driving controller when the autonomous vehicle is manually driven currently or when the mode is switched from the autonomous driving mode to the manual driving mode, and the foldable pedal controller is configured to transmit a result of the checking for the foldable accelerator pedal system and the foldable brake pedal system to the autonomous driving controller,
wherein when the result of the checking indicates that one of the foldable accelerator pedal system and the foldable brake pedal system is broken down and another of the foldable accelerator pedal system and the foldable brake pedal system is normal, a one-pedal system is activated wherein the normal pedal system is controlled to be in the pressable state while the broken down pedal system is in the unpressable state, in which traveling of the autonomous vehicle is controlled by manipulating the pedal system that is in the pressable state, and wherein the breakdown of at least one of the foldable accelerator pedal system and the foldable brake pedal system includes one or more of mechanical defects of hardware including a pedal and a motor, errors of functions of a sensor, and errors of software for controlling a foldable function of the foldable accelerator pedal system and the foldable brake pedal system.

* * * * *